United States Patent [19]

Greco

[11] 3,862,245
[45] Jan. 21, 1975

[54] RESORCINOL PREPARATION
[75] Inventor: Nicholas P. Greco, Pittsburgh, Pa.
[73] Assignee: Koppers Company, Inc., Pittsburgh, Pa.
[22] Filed: June 8, 1972
[21] Appl. No.: 261,116

Related U.S. Application Data
[60] Division of Ser. No. 18,325, March 10, 1970, abandoned, which is a continuation-in-part of Ser. No. 682,915, Nov. 14, 1967, abandoned.

[52] U.S. Cl. ............................ 260/621 M, 260/580
[51] Int. Cl. ............................................ C07c 37/10
[58] Field of Search ....................... 260/621 M, 580

[56] References Cited
UNITED STATES PATENTS

| | | | |
|---|---|---|---|
| 3,356,728 | 12/1967 | Cimerol et al. | 260/580 |
| 3,356,729 | 12/1967 | Denton et al. | 260/580 |
| 3,517,063 | 6/1970 | Nason | 260/580 |

*Primary Examiner*—Bernard Helfin
*Assistant Examiner*—Norman P. Morgenstern
*Attorney, Agent, or Firm*—Oscar B. Brumback; Olin E. Williams

[57] ABSTRACT

Resorcinol is made by hydrogenating dinitrobenzene in an aromatic mono-nuclear hydrocarbon-lower alcohol mixed solvent system in the presence of a nickel catalyst at moderate temperatures and pressures. Meta-phenylenediamine thus produced is hydrolyzed using aqueous sulfuric acid. Meta-phenylenediamine and sulfuric acid, 1.2–2.2 moles per mole of meta-phenylenediamine, are contacted in aqueous solution at a temperature of 180°–250°C. in an environment resistant to attack by the reactants for a period of time sufficient to hydrolyze the meta-phenylenediamine to resorcinol. The aqueous product solution is then contacted with an organic solvent such as benzene or ether which removes the resorcinol from the aqueous solution. The resorcinol is readily recovered from the organic solvent while the aqueous phase, after removal of some of the sulfates of ammonium, can be recycled to the reactor for hydrolysis of any unconverted meta-phenylenediamine.

3 Claims, No Drawings

# RESORCINOL PREPARATION

CROSS REFERENCE TO RELATED APPLICATION

This application is a division of application Ser. No. 18,325, filed Mar. 10, 1970, which is a continuation-in-part of application Ser. No. 682,915, filed Nov. 14, 1967, both now abandoned.

BACKGROUND OF THE INVENTION

Present processes for producing resorcinol on a commercial scale use the alkali fusion of benzene to benzene sulfonic acid. In such methods, the alkali salt of benzene disulfonic acid is fused with caustic, the melt dissolved in water and acidified with a mineral acid, filtered, and resorcinol extracted with a solvent. Such a process uses vast amounts of caustic and mineral acids.

An attempt to produce resorcinol by acid hydrolysis of metalphenylenediamine with dilute hydrochloric acid was reported by J. Meyer, Ber. 30 Page 2568 (1897). Meyer discussed the use of sulfuric acid and stannous chloride for such a hydrolysis, but taught that only low yields of resorcinol were obtained in admixture with a predominance of tarry, resinous material. This low yield and the formation of resinous material are not surprising in view of the high reactivity of resorcinol. Resorcinol is known to polymerize in the presence of both acids and bases to produce various resins. It is this problem of resin formation which led to the use of other methods than hydrolysis in the production of resorcinol.

In my copending application, Ser. No. 593,771, filed Nov. 14, 1966, now U.S. Pat. No. 3,462,497, issued Aug. 19, 1969, the use of phosphoric acid in meta-phenylenediamine hydrolysis to resorcinol is taught. In said application, an example is given of the production of tarry resinous material when sulfuric acid is used for such a hydrolysis.

One of the problems encountered in acid hydrolysis is to provide a source of substantially pure meta-phenylenediamine. Impurities in the meta-phenylenediamine serve to encourage the production of the tarry resinous material, particularly when using sulfuric acid for hydrolysis.

It has now been found that resorcinol can be made via a multistep process from either crude or pure dinitrobenzene. A pure intermediate meta-phenylenediamine is made by the hydrogenation of crude dinitrobenzene in an aromatic mononuclear hydrocarbon-lower alcohol mixed solvent using a nickel catalyst and relatively mild temperature and pressure conditions. The resulting substantially pure meta-phenylenediamine can, by employing specific mole ratios of sulfuric acid to meta-phenylenediamine, a specific temperature range, carrying out the hydrolysis in a reactor resistant to sulfuric acid attack, and removing resorcinol from the reaction mixture before degradation or polymerization occurs, be converted by sulfuric acid hydrolysis without the production of significant amounts of any resinous material.

SUMMARY OF THE INVENTION

Meta-dinitrobenzene, either relatively pure or containing ortho- or para-dinitrobenzene in amounts up to about 15 per cent by weight, is hydrogenated in a mixed solvent system consisting essentially of a mononuclear aromatic hydrocarbon and a lower aliphatic alcohol, preferably one containing up to 4 carbon atoms. Hydrogenation is done in the presence of a catalytic amount of a nickel catalyst using an elevated temperature under 100°C. and positive pressures under 400 psi. Hydrogenation is continued until the absorption of hydrogen ceases, the catalysate is filtered hot to remove catalyst, the filtrate is cooled and the crude product is crystallized therefrom. The crude product is separated and fractionated to give substantially pure meta-phenylenediamine. The meta-phenylenediamine is contacted with 1.2–2.2 moles of sulfuric acid, per mole of meta-phenylenediamine, in aqueous solution at a temperature of 180°–250°C. for a period of time sufficient to hydrolyze the meta-phenylenediamine to resorcinol. The aqueous solution is then cooled and the resorcinol extracted by a suitable organic solvent, with the unconverted meta-phenylenediamine and the sulfates of ammonia remaining in the acidic aqueous phase. In a particular embodiment of the invention, after removing some inorganic sulfates from the aqueous phase, the unconverted meta-phenylenediamine and additional sulfuric acid are fed back to the reactor for further hydrolysis. The organic solvent solution of resorcinol is concentrated to give resorcinol in excellent yields and with little or no tarry material.

DETAILED DESCRIPTION

The starting material for use in the present invention is meta-dinitrobenzene, which can be either relatively pure or a crude material containing up to 15% by weight ortho- and para-dinitrobenzene. Commercially available crude dinitrobenzene typically is 87% by weight meta-dinitrobenzene, 12% ortho-dinitrobenzene and 1% para-dinitrobenzene. After hydrogenation, the corresponding phenylenediamines are easily separated by fractionation.

The key to providing as a resorcinol intermediate relatively pure meta-phenylenediamine is the solvent used for the hydrogenation of meta-dinitrobenzene. The solvent of the invention has two organic components which when combined provide a mixed solvent having physical characteristics approaching that of a constant boiling mixture.

One organic component of the novel mixture is a mononuclear aromatic hydrocarbon, composed of only carbon and hydrogen. Useful hydrocarbons of this class include benzene, toluene, xylene, and mixtures thereof. The second component is a lower aliphatic alcohol, preferably one having up to 4 carbon atoms. Typically useful alcohols include methanol, ethanol, isopropyl alcohol and tertiary butyl alcohol.

The relative proportion of mononuclear hydrocarbon to aliphatic alcohol is not of particular importance, although two essential conditions must be fulfilled in providing a suitable mixed solvent. First, the aromatic hydrocarbon component of the mixed solvent must be present in an amount sufficient to dissolve the meta-dinitrobenzene and sufficient alcohol must be present to dissolve the reaction products, i.e., meta-phenylenediamine and water. Ordinarily, about 7 moles of hydrocarbon are required to dissolve 1 mole of meta-dinitrobenzene at room temperature. However, at temperatures approaching the hydrogenation temperature this solubility increases 3 or 4 fold. From the hydrogenation of 1 mole of meta-dinitrobenzene the products are 1 mole of meta-phenylenediamine and 4 moles of water. Ordinarily, the alcohol must be present in an amount sufficient to dissolve all of the water and to some extent the phenylenediamine, thereby providing a clean catalyst surface during the reaction. If the mixed solvent is heated to the maximum reaction temperature the hydrocarbon portion will assist in dissolving the product meta-phenylenediamine, thus reducing the alcohol requirement.

The second essential feature of the mixed solvent system is that its physical characteristics, based on the proportions in which the components are mixed, approach those of a constant boiling mixture. The aromatic hydrocarbons and alcohols, when mixed together form either binary azeotrope consisting of hydrocarbon and alcohol or a ternary azeotrope consisting of hydrocarbon, alcohol and water. Because the azeotrope is a true constant boiling mixture, its use is most desirable from the standpoint of solvent recovery and reuse. Particularly effective are the binary azeotropes, because they may be easily separated from the water of reaction during distillation. The ternary azeotropes are less desirable because of the problem of water separation. It is not necessary to use an azeotropic mixture according to the present invention, provided that boiling points of the organic components of the solvent are such that their mixture approaches the characteristics of a constant boiling mixture; i.e., the boiling points of the individual components are such that the solvents are not easily separable from each other by simple distillation. I have found that, if the hydrocarbon and the alcohol are selected so that their boiling points do not differ by more than 5°C., for practical purposes, the resulting mixed solvents have the physical characteristics of a constant boiling mixture. If the choice of hydrocarbon and alcohol is such that the boiling points differ by more than 5° they should be used in an amount substantially corresponding to the azeotropic mixture.

Mixed solvents having the two essential characteristics will ordinarily contain from 20-95 parts by volume hydrocarbon and 5-80 parts by volume alcohol. Concentrations of meta-dinitrobenzene in the mixed solvent of up to 10% by weight at room temperature and up to 30% by weight at the hydrogenation temperature (up to 100°C.) meet the solubility requirements of the solvent system.

Any nickel catalyst ordinarily used for hydrogenation is suitable in the present invention. Such catalysts include the sponge nickel catalysts, e.g., Raney nickel, or the supported nickel catalysts, such as metallic (reduced) nickel supported on an inert substance, such as Kieselguhr, Fullers earth, kaolin, activated carbon, silica gel, alumina, and silica alumina. Such catalysts contain about 10-70% nickel based on the weight of the composition. Often the catalysts contain from 0.5-5% by weight of a promoter such as reduced metal oxide, e.g., zirconium.

A catalytic amount of catalyst may vary from about 0.5-10% by weight based on the weight of the meta-dinitrobenzene. The use of about 5-10% by weight catalyst is ordinarily convenient and no technical advantage is gained by using more than this amount.

Because of the explosive nature of large concentrations of meta-dinitrobenzene, which is offset to a considerable extent in the present invention by the novel mixed solvent system, it is desirable to operate at low temperatures and moderate pressures. Elevated temperatures from about 40°C. up to about 100°C. are effective. At temperatures below 40°C. hydrogenation is sluggish and above 100°C. there is some danger of hydrogenating the aromatic portion of the solvent. The pressures employed can vary from a slight positive pressure sufficient to initiate hydrogenation up to about 150 psig. High pressures, those in the range of 300-400 psig, can be used although no particular advantage is obtained to offset the increase in equipment cost. Preferred pressures range between 45 and 150 psig. because of problems of removing the heat of hydrogenation.

Hydrogenation is done under mild agitation, e.g., a stirrer speed of 400-700 rpm, and is continued until hydrogen absorption ceases. The hydrogenation time will depend on the reaction temperatures and pressures, the catalyst activity and the amount of catalyst. Generally, hydrogenation is complete in a period of 2-8 hours. After the hydrogenation is complete the catalysate is filtered hot to remove the catalyst. After removing the catalyst the filtrate is cooled and the product phenylenediamine crystallizes therefrom. The mixed solvent is separated from crystalline phenylenediamines and the water, preferably by filtration followed by distillation, and the crude product is obtained as a thick dark gray syrup. Fractionation of the crude product gives a substantially quantitative yield of essentially pure white meta-phenylenediamine, along with by-product ortho- and para-phenylenediamines.

The meta-phenylenediamine thus obtained is hydrolyzed with sulfuric acid and water. Sulfuric acid is used in the hydrolysis of meta-phenylenediamine in aqueous solution because of the strong hydrolysis effected by this acid and because of the resistance of certain metals to this acid at the temperatures necessary in the present process. Other mineral acids, such as phosphoric acid and hydrochloric acid, pose problems of high cost, corrosion, or volatility when used in a continuous high temperature process. The third reactant necessary in the hydrolysis is water. Water must be present in a sufficient amount to provide hydrolysis and also to serve as a diluent or solvent for the meta-phenylenediamine and sulfuric acid to enable sufficient contact of these reactants. The amount of water should be that sufficient to provide an aqueous solution of meta-phenylenediamine of from 5-15% by weight. If less than a 5% solution of meta-phenylenediamine in water is used, the reaction is too slow to be practical, while the use of greater percentages than about 15% creates the danger of plugging the reactor or lines. Preferably, about an 8-10% by weight solution of meta-phenylenediamine in water is used.

A mole ratio of between 1.2-2.2 moles of sulfuric acid per mole of meta-phenylenediamine has been found to be necessary for sufficient conversion of meta-phenylenediamine to resorcinol. If mole ratios below about 1.2 moles of sulfuric acid per mole of meta-phenylenediamine are used, insufficient conversion results and large amounts of unreacted starting materials remain in the aqueous solution. If in excess of about 2.2 moles of sulfuric acid per mole of meta-phenylenediamine is used, the yield drops significantly. In fact, a peak exists somewhere in the range between 1.2-2.2 moles of sulfuric acid per mole of meta-phenylenediamine for the conversion regardless of the temperature used, as is evidenced in the examples that follow. The data show a peak in the order of 1.6-1.8 moles of sulfuric acid per mole of meta-phenylenediamine the peak being more pronounced at higher temperatures. This range is 1.6–1.8 moles, the preferred mole ratio used in the present process.

The feed solution of sulfuric acid, water and meta-phenylenediamine is preferably formed by first combining the sulfuric acid and water. Then, upon the addition of meta-phenylenediamine to this acidic solution, the acid salt of meta-phenylenediamine is formed. This salt is more readily solubilized in the acidic aqueous media than is meta-phenylenediamine in water. A homogeneous feed solution is thus formed which can be easily pumped through the reaction zone for conversion of the meta-phenylenediamine to resorcinol. However, the reactants may be combined in other addition sequences.

The feed solution is heated in a reaction zone which must be resistant to any substantial attack by the sulfuric acid or the meta-phenylenediamine. It has been found that conventional metal reactors such as those made of stainless steel or monel metal are not suitable for the process because of attack by the reactants. When using such metals, a metal-amine complex appears to be formed during the reaction which leads to the formation of tarry residues and polymerization of the resorcinol produced during the reaction period. Thus, the zone of heating, where the hydrolysis occurs, must be constructed of a meterial which will not cause tar formation. Examples of such materials include tantalum metal or glass.

The temperature used for the hydrolysis must be between 180°–250°C. The yield of resorcinol increases, at each concentration of sulfuric acid to meta-phenylenediamine, as the temperature increases. If temperatures below about 180°C. are used, the yield is insufficient, while temperatures in excess of about 250°C. result in excessive decomposition or by-product formation. Temperatures in excess of 250°C. have resulted in $SO_2$ formation, which indicates that the sulfuric acid is acting as an oxidant rather than as a hydrolyzing agent at these higher temperatures.

The pressure used during the hydrolysis step should be that sufficient to maintain the reaction solution in aqueous phase. No advantage is seen in increasing or decreasing the pressure to a value other than that sufficient to provide for a liquid reaction media.

The residence time, or the contact time, of the reactants in the hydrolysis zone will vary depending upon the temperature and the mole ratio of sulfuric acid to meta-phenylenediamine. A residence time of between 1.5 to 8 hours has been found to be best suited for the temperature range used in the present invention. As the residence time for the sulfuric acid and the meta-phenylenediamine in the heated zone increases, the yield of resorcinol also increases.

After sufficient contact time in the heated zone, the product solution is cooled. The cooling is needed to prevent polymerization of the resorcinol in the acidic aqueous product solution and to enable the separation of the resorcinol by organic solvent extraction. Various solvents which sufficiently dissolve resorcinol and are immiscible in water are usable. Suitable solvents include alcohols such as n-butanol; ethers such as diethyl ether, dimethyl ether, and diphenyl ether; aromatics such as benzene, toluene, chlorobenzenes, and nitrobenzene; chlorinated hydrocarbons, such as methylene chloride, chloroform, and trichloroethylene; aliphatic-hydrocarbons such as cyclohexane, petroleum ether and the like.

The organic solvent phase is then separated such as by decanting, and the resorcinol recovered therefrom by distillation or other means. Removal of the solvent by distillation leaves high purity resorcinol as product. If further purification of the resorcinol is desired, the resorcinol may be distilled at reduced pressure to give an even purer product.

The conditions of the present process are such that some of the meta-phenylenediamine remains in the aqueous product solution. Complete conversion has been found to be impractical because of the danger of decomposition or polymerization of the resorcinol in the product solution. Thus, it is desirable that the acidic aqueous phase containing unreacted meta-phenylenediamine, after extraction of the resorcinol, be recycled to the reactor in order to give highly economical yields. This is readily done because of the easy separability of the product resorcinol by solvent extraction, while the unconverted meta-phenylenediamine and the sulfates of ammonium remain in the acidic aqueous solution. An important aspect of the process is the fact that, since significant quantities of resinous matter are not formed, the aqueous phase may be recycled without danger of clogging or stoppage in the apparatus. The recycle may be fed back to the reactor without removing the sulfates of ammonia, if a bleed is taken in the recycle line so as to keep the concentration of such sulfates of ammonia at a low enough concentration to prevent interference with the hydrolysis reaction.

The invention will be more fully understood by the following examples.

EXAMPLE I

A 1-gallon stirred autoclave was charged with 500 ml. of 95% ethanol and 500 ml. of sulfur-free benzene. Raney nickel (10 g.) washed free of water with ethanol was added with meta-dinitrobenzene (practical grade) (80 g., 0.47 mole). The mixture was hydrogenated at 63°C. under 45–150 psi of $H_2$ until absorption of hydrogen ceased (4 hrs.). The measured hydrogen pressure drop was 295 psi (calc'd. 310 psi).

The catalyzate was filtered and the filtrate stripped to dryness on a steam bath to give 56 g. of a thick, dark gray syrup which slowly crystallized as a light gray solid (51.5 g. theory). Infrared identification indicated the crude m-phenylenediamine to be free of nitro groups. The crude product was flash distilled to give 49.2 g. (96%) of white m-phenylenediamine intermediate, and by- product o- and p-phenylenediamines.

Similar results are obtained by substituting for the 50% ethanol–50% benzene (by volume) mixed solvent the azeotropic compositions indicated in the table below.

Table I

| Hydrocarbon (b.p.°C.) | Alcohol (b.p.°C.) | Azeotropic Composition % by volume | | Azeotrope (b.p.°C.) |
|---|---|---|---|---|
| | | Hydrocarbon | Alcohol | |
| A. benzene (80) | isobutanol (107) | 90.7 | 9.3 | 79.8 |
| B. o-xylene (143) | n-butanol (117) | 25.0 | 75.0 | 117.0 |

Table I—Continued

| Hydrocarbon (b.p.°C.) | Alcohol (b.p.°C.) | Azeotropic Composition % by volume | | Azeotrope (b.p.°C.) |
|---|---|---|---|---|
| | | Hydrocarbon | Alcohol | |
| C. benzene (80) | methanol (65) | 40.0 | 60.0 | 58.0 |
| D. toluene (111) | methanol (65) | 31.0 | 69.0 | 64.0 |
| E. benzene (80) | ethanol (78) | 68.0 | 32.0 | 68.0 |
| F. toluene (111) | ethanol (78) | 32.0 | 68.0 | 76.0 |

EXAMPLE II

A solution was prepared by admixing 23 pounds of water and 3.5 pounds of 98% sulfuric acid (16 m.). After cooling to ca 50°C., 2.4 pounds of meta-phenylenediamine (10 m) prepared as described in Example I was added slowly. This feed solution, about 8% meta-phenylenediamine by weight, contained 1.6 moles of sulfuric acid per mole of meta-phenylenediamine. This feed solution was fed through a tantalum tubular reactor surrounded by an oil bath held at 220°C. The solution was fed at a rate of 0.28 pounds per hour and under 350 psig nitrogen pressure. This feed rate gave a residence time in the heated zone of three hours. At the exit of the heated zone, the product solution was cooled and the product extracted by ethyl ether washing. The ethyl ether extract was distilled to leave a dry residue. The residue weight 756 g., (theory 1100 g.). The percent conversion was 68.7 percent. The residue was analyzed by infra-red and vapor-phase chromotography, and showed 98.5% resorcinol. This corresponds to a 67.5 per pass yield of resorcinol. Flash distillation of the resorcinol at 120°/9 mm gave 748 g. of pure resorcinol (99.7% purity, by freezing point determination).

EXAMPLE III

The aqueous mixture, following the ether extraction in Example II was found to contain meta-aminophenol and unreacted meta-phenylenediamine as their sulfates. This aqueous solution is recycled to the reaction after withdrawing 19.8 pounds of effluent to maintain a liquid balance. The effluent was made ammonical and extracted with ether. Distillation of the ether gave a mixture of meta-phenylenediamine and metal-aminophenol. The aqueous effluent, following ether extraction, contained ammonium sulfate. To the recycle aqueous solution, there is added make-up meta-phenylenediamine (1.63 pounds) and 98% sulfuric acid (2.3 pounds) dissolved in 16.5 pounds of water. This reaction mixture is subjected to the process of Example II. After three hours residence time, at 220°C., the product, on either extraction, gives 875 g. of resorcinol.

EXAMPLE IV

A run was made as in Example II, except that a mole ratio of sulfuric acid to meta-phenylenediamine of 1.2:1 and a temperature of 200°C. were used. The results of the run were: conversion, 20.1%; weight per cent of resorcinol in product, 84%; yield per pass, 16.7%.

EXAMPLE V

A series of runs were then made at 200°C., generally according to Example IV, varying the mole ratio of sulfuric acid to meta-phenylenediamine. The results are listed in Table II.

Table II

| Run | Mole Ratio H₂SO₄/MPDA | Reaction Temperatures (200°C.) | | |
|---|---|---|---|---|
| | | % Conversion | Purity | Yield per Pass % |
| A (Ex. II) | 1.2 | 20.1 | 84% | 16.7 |
| B | 1.6 | 23.4 | 90 | 20.6 |
| B¹ (6 hours contact time) | 1.6 | 43.1 | 86 | 38.4 |
| C | 2.0 | 17.0 | 94 | 16.0 |

EXAMPLE VI

A series of experiments were run generally according to Example II, with varying mole ratios of sulfuric acid to meta-phenylenediamine. The results are listed in Table III.

Table III

| Run | Hours | Mole Ratio H₂SO₄/MPDA | Reaction Temperatures (220°C.) | | |
|---|---|---|---|---|---|
| | | | % Conversion | Purity | Yield per Pass % |
| D | 1.5 | 1.6 | 45 | 81 | 19 |
| E | 1.5 | 2.0 | 35.2 | 96 | 34.5 |
| F | 1.5 | 3.0 | 20.5 | 93 | 19.1 |
| G | 3 | 1.2 | 33.2 | 91 | 30.6 |
| H | 3 | 1.6 | 66.0 | 87 | 57.5 |
| I | 3 | 2.0 | 46.2 | 96 | 44.3 |
| J | 6 | 1.6 | 73.5 | 94 | 69.8 |

EXAMPLE VII

To a monel metal autoclave was charged 450 grams of meta-phenylenediamine (4.13 moles) prepared as described in Example VI, 5,000 grams of water and 945 grams of 96% sulfuric acid (9.25 moles). The resulting reaction mixture contained sulfuric acid in about 14% concentration. The autoclave was purged with nitrogen and heated to 180°C. After 2.5 hours at 180°–190°C., the reaction was stopped and the product was a resinous mass from which no resorcinol could be extracted. A metal-amine complex identified by infra-red was found present in the product. It was insoluble and came out of solution. It adherred to the walls of the reactor as a black tar. There is thus evidenced the necessity of using an environment in the heated reaction zone which is resistant to the sulfuric acid and to attack by the diamine or acid salts thereof.

What is claimed is:

1. A method of making resorcinol comprising:
   a. dissolving m-dinitrobenzene in a mixed solvent consisting essentially of a mononuclear aromatic hydrocarbon selected from the group consisting of benzene, toluene and xylene and mixtures thereof and an alkanol having one to four carbon atoms,
      1. said aromatic hydrocarbon being present in an amount sufficient to dissolve said m-dinitrobenzene,
      2. said alcohol being present in an amount sufficient to dissolve the water of reaction and m- phenylenediamine that is subsequently to be produced from said m-dinitrobenzene and that will not be dissolved by said aromatic hydrocarbon, and 3. said aromatic hydrocarbon and said alcohol being selected and mixed in such proportions as to provide a mixed organic solvent having the physical characteristics of a constant boiling mixture, b. contacting the resulting solution with hydrogen under positive pressure at an elevated temperature less than 100°C. in the presence of a nickel catalyst until hydrogen absorption ceases, c. separating substantially pure m-phenylenediamine from the hydrogenated mixture by fractional distillation, d. contacting said m-phenylenediamine with 1.2–2.2 moles of concentrated sulfuric acid per mole of said m-phenylenediamine in aqueous solution containing initially 5–15% by weight of m-phenylenediamine based upon the amount of water in said solution at a temperature of 180°–250°C. for a time sufficient to hydrolyze m-phenylenediamine to resorcinol to form an aqueous product solution, e. cooling said aqueous product solution to prevent polymerization of the resorcinol that has been formed, f. extracting resorcinol from said cooled aqueous product solution with a water immiscible solvent, and g. recycling said remaining aqueous product solution back to the hydrolyzing step (d) for the production of more resorcinol.

2. The process of claim 1 wherein said sulfuric acid is present in an amount of 1.6–1.8 moles per mole of meta-phenylenediamine.

3. The process of claim 1 wherein the temperature of step (d) is between 200°–230°C.

* * * * *